United States Patent [19]
Neumeister et al.

[11] Patent Number: 5,954,935
[45] Date of Patent: Sep. 21, 1999

[54] ELECTROLYTIC CELL ARRANGEMENT FOR THE DEIONIZATION OF AQUEOUS SOLUTIONS

[75] Inventors: Herbert Neumeister; Leander Fürst; Reinhold Flucht, all of Jülich, Germany

[73] Assignee: Forschuugszentrum Jülich GmbH, Jülich, Germany

[21] Appl. No.: 08/756,986

[22] Filed: Nov. 26, 1996

Related U.S. Application Data

[63] Continuation-in-part of application No. PCT/DE95/00696, May 23, 1995.

[51] Int. Cl.$^6$ .................................................. B01D 61/44
[52] U.S. Cl. ................................................................ 204/632
[58] Field of Search ................................................. 204/632

[56] References Cited

U.S. PATENT DOCUMENTS

| | | | |
|---|---|---|---|
| 2,812,300 | 11/1957 | Pearson | 204/151 |
| 2,923,674 | 2/1960 | Kressman | 204/180 |
| 2,980,598 | 4/1961 | Stoddard | 204/151 |
| 4,548,695 | 10/1985 | Bridger et al. | 204/284 |
| 5,026,465 | 6/1991 | Katz et al. | 204/632 |
| 5,211,823 | 5/1993 | Guiffrida et al. | |
| 5,451,309 | 9/1995 | Bell | 204/632 |

FOREIGN PATENT DOCUMENTS

| | | |
|---|---|---|
| 0 170 895 | 2/1986 | European Pat. Off. |
| N 6351 IVc/ 12d | 3/1956 | Germany |
| 33 29 813 | 7/1992 | Germany |
| 32 17 990 | 10/1992 | Germany |

OTHER PUBLICATIONS

Hans–Günther Heitmann, "Saline Water Processing", *VCH Publishing*, 1990 (No Month).

*Primary Examiner*—Arun S. Phasge
*Attorney, Agent, or Firm*—Klaus J. Bach

[57] ABSTRACT

In an electrochemical cell arrangement for the deionization of aqueous solutions by ion exchange including cathode and anode chambers having electrodes disposed therein, a brine chamber is disposed between, and directly adjacent to, the cathode and anode chambers which are filled with anion and cation exchanger materials such that the electrodes are directly in contact therewith and means are provided for conducting the aqueous solution to be treated through the cathode and anode chambers and means for passing brine through the brine chamber to be charged therein by the ions removed from the aqueous solution in the cathode and anode chambers.

11 Claims, 5 Drawing Sheets

Cell 1 Cell 2

Fig. 6a
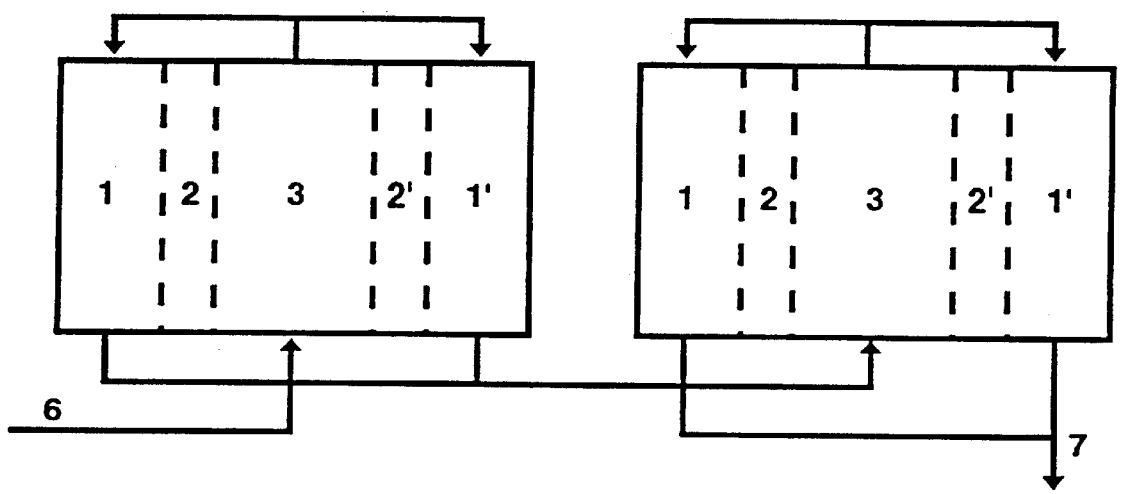
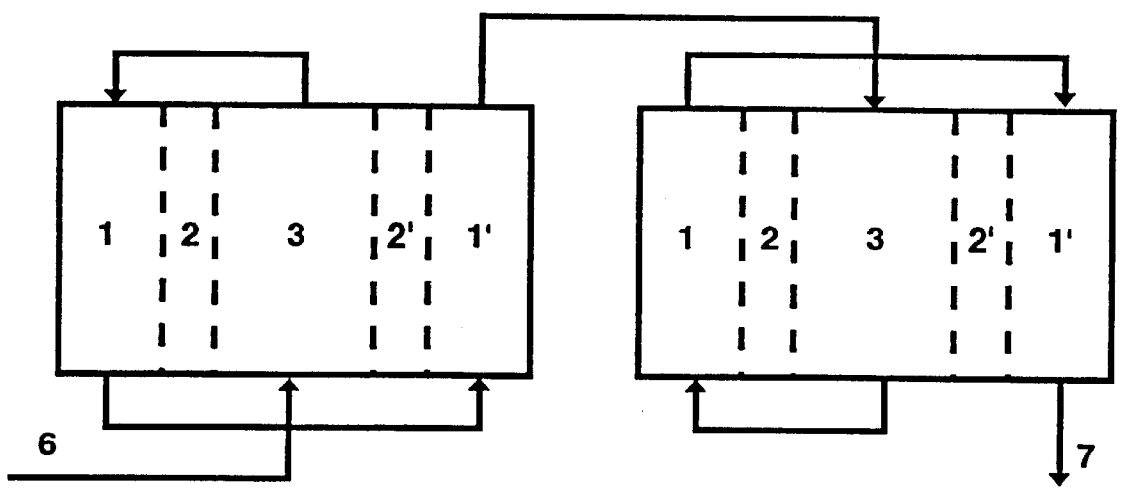
Fig. 6b

ELECTROLYTIC CELL ARRANGEMENT FOR THE DEIONIZATION OF AQUEOUS SOLUTIONS

This is a Continuation-In-Part application of Interational application PCT/DE95/00696 of May 23, 1995 claiming the priority of German application P 44 18 812.9 of May 30, 1994.

BACKGROUND OF THE INVENTION

The invention relates to an electrochemical cell for the deionization of aqueous solutions by ion exchange wherein on one side the aqueous solution is conducted through an ion exchanger in the cell and a brine flow is conducted through a brine space in the cell which is separated from the ion exchanger by a membrane.

For the deionization of aqueous solutions, particularly in the manufacture of high-purity water electrodialysis cells utilizing a mixed bed ion exchanger technique are in use today. They use an electrodialysis unit as shown in the European patent application 0 170 895 and are designed in such a way that channels are formed between the cathode and the anode which are separated from one another by cation and ion permeable membranes. The electrode chambers arranged at the two opposite sides of the cell form brine spaces through which a brine flow is conducted. Adjacent each of the brine spaces toward the center of the cell, there is a resin chamber filled with ion exchanger material comprising a mixed bed of anionic and cationic exchanger resin. The two resin chambers are separated from each other by a central brine chamber arranged in the middle of the electrodialysis unit (see also GIT Fachz, Lab. March 1994, p.190–198). Such an electrodialysis cell unit can be extended by disposing, between the electrode spaces forming the brine chamber, additional resin and brine channels or chambers in an alternating sequence.

However, such electrodialysis cells filled with mixed resins have the disadvantage that an electrochemical regeneration of the ion exchanger bed is certain only if water dissociates to form protons and hydroxyl ions.

It is the object of the present invention to provide an electrochemical cell which can be controlled directly by an electric field or an electric current applied thereto. It is a further object of this invention to provide various arrangements of electrolysis cells as single cells or combination units of several cells.

SUMMARY OF THE INVENTION

In an electrochemical cell arrangement for the deionization of aqueous solutions by ion exchange including cathode and anode chambers having electrodes disposed therein, a brine chamber is disposed between and directly adjacent to the cathode and anode chambers which are filled with anion and cation exchanger materials such that the electrodes are directly in contact therewith and means are provided for conducting the aqueous solution to be treated through the cathode and anode chambers and for passing brine through the brine chamber to be charged therein with the ions removed from the aqueous solution flowing through the cathode and anode chambers.

With this arrangement, the $H^+$- and/or $OH^-$- ions needed for the regeneration of the resin beds are generated at the electrodes in the resin beds and regenerate the respective resin bed which facilitates continuous operation of the resin all and results in an electrochemical regeneration of the resin beds from the entrance end to the exit ends of the resin beds. The regeneration and the stationary loading state of the resin can be controlled with the cell according to the invention by variation of the current density applied. Furthermore, the cell according to the invention is easy to manufacture and easy to service because it has relatively few cell chambers and few membranes and is of simple design. Another advantage of the cell according to the invention resides in the fact that formation of oxidizing gases at the anodes arranged directly in the main stream of the water to be treated prevents or at least limits the development of germs in the resin bed and in the water.

A further advantage of the cell according to the invention is that, by transformation of dissolved oxygen at the cathodes, ion exchange resins, particularly those with quaternary tri-methyl-ammonium groups, are protected from oxidation degeneration. The hydrogen formed at the cathodes further increases this effect.

The electrochemical cell according to the invention can further easily be built up to form a multiple electrolysis cell arrangement wherein at least two of the cells are disposed adjacent each other in such a way that electrode chambers with the same electrodes are disposed adjacent each other and have a common electrode or that electrode chambers with different electrodes are disposed in side-by-side relationship and are separated by a bipolar membrane or a bipolar electrode. Multiple electrolysis cells of such an arrangement are particularly advantageous for an effective utilization of the electrodes. Simply by the addition of one electrode and two ion exchange membranes the capacity of the cell can be doubled. With multiple electrolysis cell units, it is also possible to maintain the local current density more constant over the full chamber length. Further advantageous arrangements are multiple electrolysis cells with electrode chambers which have a common electrode or arrangements with chambers which are separated by a bipolar membrane or a bipolar electrode.

In addition, the single or multiple electrolysis cells according to the invention can be arranged in a series-arrangement in any desired combination. Such arrangements have the advantage that different current densities can be applied in the various cells so that the cells can be operated always below the current density limit. This results in an optimum current utilization of the system.

Another advantage of serially arranged multi-electrolysis cells is that a spatial distance can be provided between the cells such that partial deionization can be performed in a central location and total deionization of the high-purity water can be performed near the consumer.

If further the brine is conducted through the electrolysis cells which are combined with each other such that the brine flows in counter current fashion with respect to the solution to be treated by ion exchange, back-diffusion in the second electrolyses cell is reduced so that the pure water quality is improved.

Preferably, the brine admission line is branching off the supply stream for the solution to be treated by ion exchange. This has the advantage that the brine can be returned to the solution to be treated in a pretreatment stage after passing through the brine chambers whereby the need for a brine waste water effluent is avoided.

In addition, the brine chambers of the cells receiving the brine stream are filled with net-like spacer and/or with ion exchange resins wherein the ion exchange resin comprises anionexchange as well as cationexchange resins or a mixture of the two. The resin filling increases the ion conductivity in the brine chamber whereby the total cell voltage is substantially decreased. After completion of the deionization process, the brine stream can be supplied to a pretreatment stage for example to the inlet of a reverse osmosis system arranged ahead of the electrolysis cell so that, in the end, only deionized fluid is produced and the ratio of pure water to supply water is improved.

In a further advantageous embodiment of the invention, the membranes separating the brine chambers from the electrode chambers are anion exchange and cation exchange membranes.

Various embodiments of the invention are schematically shown in the drawings and will be described below;

BRIEF DESCRIPTION OF THE DRAWINGS

FIGS. 5A, 5B and 5C and FIGS. 6A and 6B show schematically various possibilities for the arrangement of cell units.

DESCRIPTION OF PREFERRED EMBODIMENTS

Figure 1:
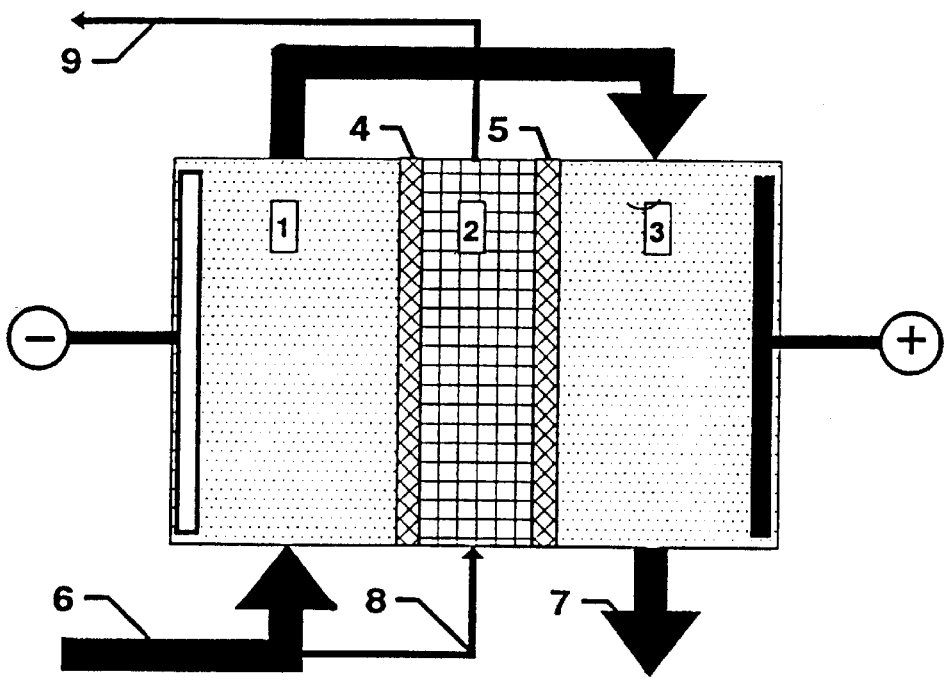
FIG. 1 shows a single electrochemical cell.

FIG. 1 shows a simple electrochemical cell including a cathode chamber 1 filled with an anion exchanger and an anode chamber 3 filled with a cation exchanger. Disposed between the cathode chamber 1 and the anode chamber 3 is a brine chamber 2 which is separated from the two electrode chambers 1 and 3 by an anion exchange membrane 4 and a cation exchange membrane 5.

A solution to be treated is supplied, by way of a supply line 6, first to the cathode chamber 1 and through the anion exchanger contained therein and subsequently to the anode chamber 3 and through the cation exchanger contained therein. During passage through the chambers 1 and 3, the solution is deionized. The deionized solution is finally removed through a flow-out line 7. From the solution supply line 6, a brine admission line 8 branches off and leads to the brine chamber 2 for admitting brine to the brine chamber. In the brine chamber 2, the anions and cations passing through the membranes 4 and 5 are transferred to the brine flowing through the brine chamber 2 and are carried away with the brine stream by way of a dump line 9.

Figure 2:
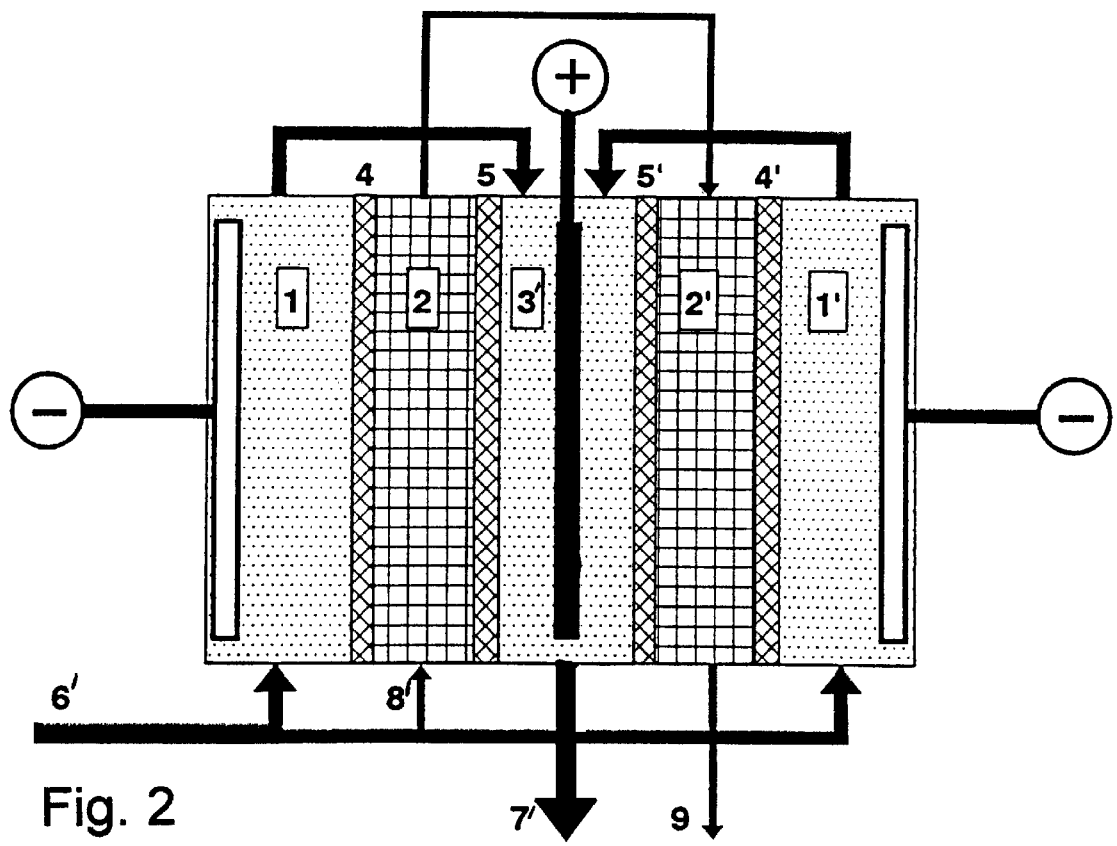
FIG. 2 shows an arrangement in which two cells of the type shown in FIG. 1 are combined.

FIG. 2 shows an arrangement in which two of the cells of FIG. 1 are arranged adjacent one another such that the two anode chambers are disposed side-by-side and a common anode (+) is provided. The common anode chamber 3' provided thereby is separated from the two cathode chambers 1,1' by the two brine chambers 2, 2', the chambers 1 and 2 and 1' and 2' being separated from each other by the anion exchange membranes 4 and 4' and the cation exchange membranes 5 and 5' respectively. FIG. 2 also shows schematically how the main solution stream and the brine flow can be conducted through such a multiple electrolysis cell arrangement:

In the arrangement as shown in FIG. 2, the solution to be treated is first conducted in a unidirectional flow through the two cathode chambers 1, 1'. The two partial streams are then combined to flow through the anode chamber 3' where the solution is further deionized and finally leaves the anode chamber 3' through the flow-out line 7'. The brine stream which branches off the main solution supply line 6' enters the brine chamber 2 via the brine admission line 8' and is first conducted through the brine chamber 2 and then through the brine chamber 2' in such a way that the brine flows through the brine chamber 2 in a unidirectional manner with the solution flow through the cathode chamber 1 and through the brine chamber 2' in a counter-current manner with respect to the solution flow through the cathode chamber 1'.

The multiple electrolysis cell arrangement as shown in FIG. 2 may be extended as required by adding one or more units of the cell shown in FIG. 1 in such a way that the same type electrode chambers are disposed adjacent one another. In this way, a common electrode may be provided for the electrode chambers of two adjacent cells. Cathode and anode chambers are then arranged alternately in succession and are separated in each case by a brine chamber.

Figure 3:
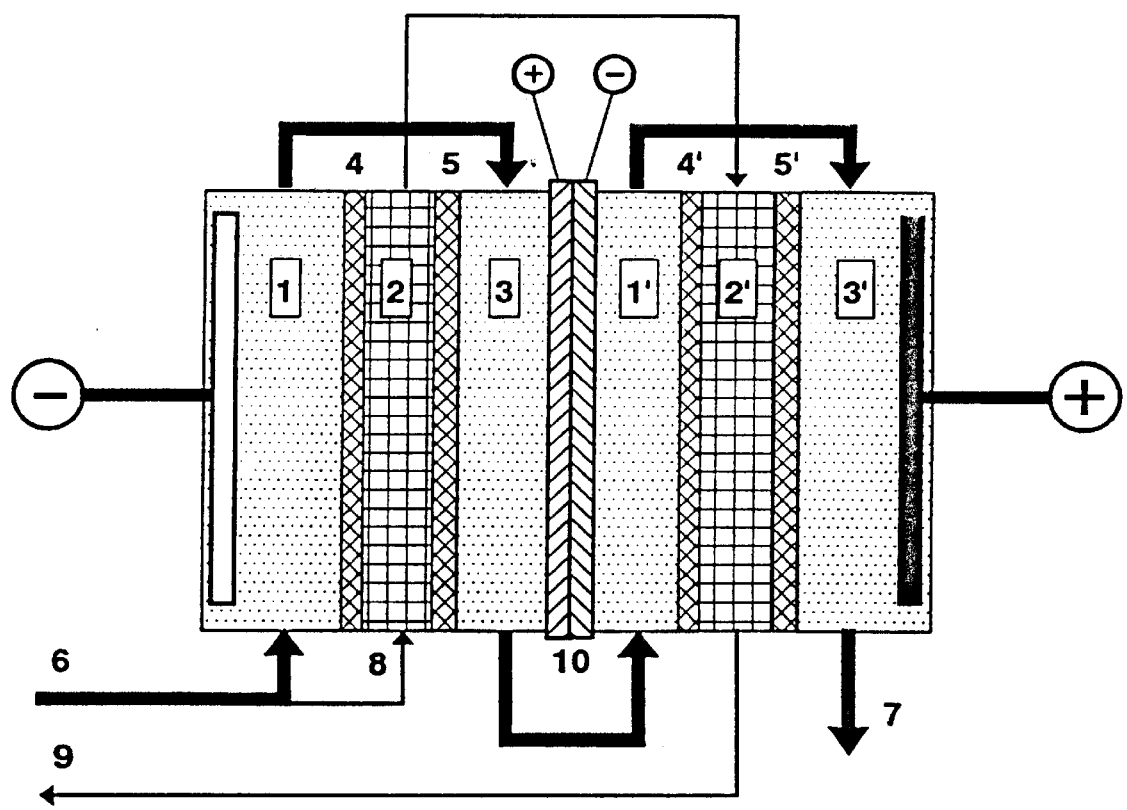
FIG. 3 shows another arrangement of two combined cells.

The multiple electrolysis cell arrangement as shown in FIG. 3 is different from that shown in FIG. 2 in that the anode chamber 3 of one cell is disposed adjacent the cathode chamber 1' of the other cell and they are separated from each other by a bi-polar membrane 10. The main solution flow and the brine flow through the various chambers of the cell arrangement is clearly indicated in the drawing. It extends through the chambers in an alternating fashion.

Also the multiple electrolysis cell as shown in FIG. 3 may be expanded further by adding one or more cells of the type shown in FIG. 1 in an appropriate fashion.

Further, cells of the type as shown in FIG. 1, in FIG. 2 or in FIG. 3 may be attached to one another so that electrolysis cell arrangements with multiple cell are formed which have the same type of electrode chambers disposed adjacent each other with a common electrode as well as opposite type electrode chambers disposed adjacent each other which are separated from each other by a bipolar electrode element.

Figure 4:
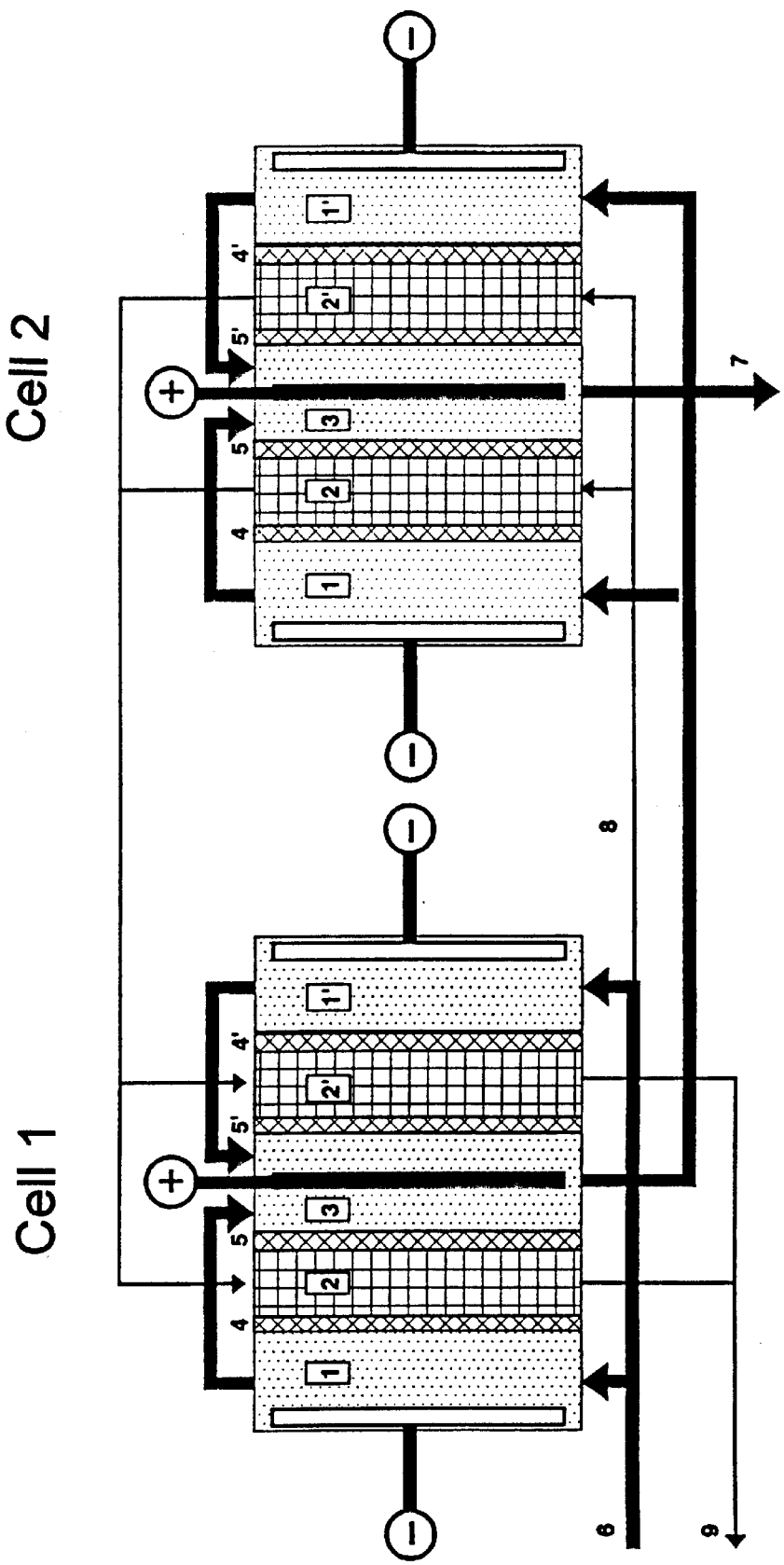
FIG. 4 shows an arrangement in which two units of the type shown in FIG. 2 are arranged in series.

FIG. 4 shows two of the cells of FIG. 2 arranged in series. In this case, the main stream of the solution to be treated is conducted first through the cell I in the same manner as shown in, and described with respect to, FIG. 2. After deionization in the anode chamber 3', the solution is conducted to the cell II and flows through the cell II in the same manner as it flows through cell I. The brine however flows, with regard to the two combined cells, in a counter-current fashion, that is the brine flow branching off the main solution flow is first directed to the cell II. It passes through the brine chambers 2 and 2' in the same direction and is then conducted to the cell I and flows also through the tow brine chambers 2 and 2' of this cell in the same direction. In an actual embodiment of an arrangement as shown in FIG. 4, the main solution flow 6 through the cells I and II was 130 l/h. The solution conductivity at the entrance to the cell I was 30 $\mu$s/cm; at the outlet of cell I it was 0.8-0.5 $\mu$s/cm and at the outlet 7 of cell II, it was 0.8-0.5 $\mu$s/cm and at the outlet of cell II it was 0.055 $\mu$s/cm (at 25° C.). The brine flow through line 8 was about 10 l/h with a conductivity of about 150 $\mu$/cm. This partial flow can be returned to the process if it is first conducted through a reverse osmosis apparatus. The electric currents applied to the cells I and II were five and one ampere with resin volumes of 0.8l for anion and cation resins per cell.

Figure 5A:
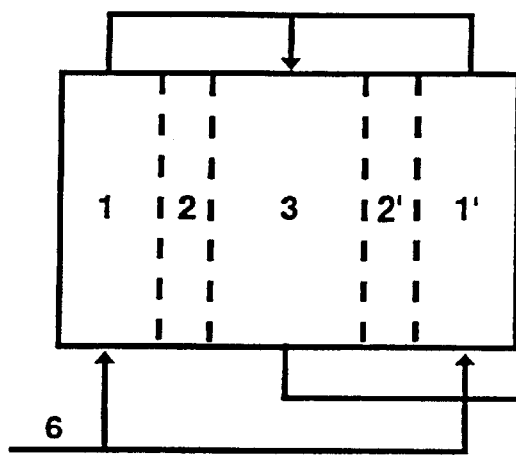
Figure 5A:
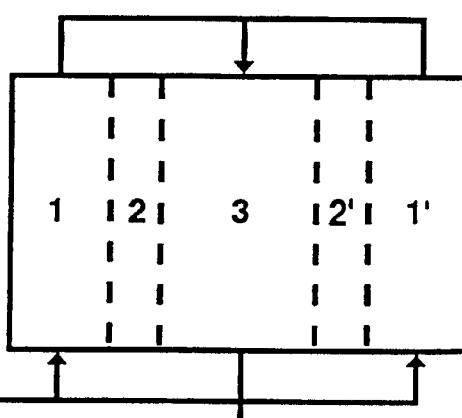
Figure 5B:
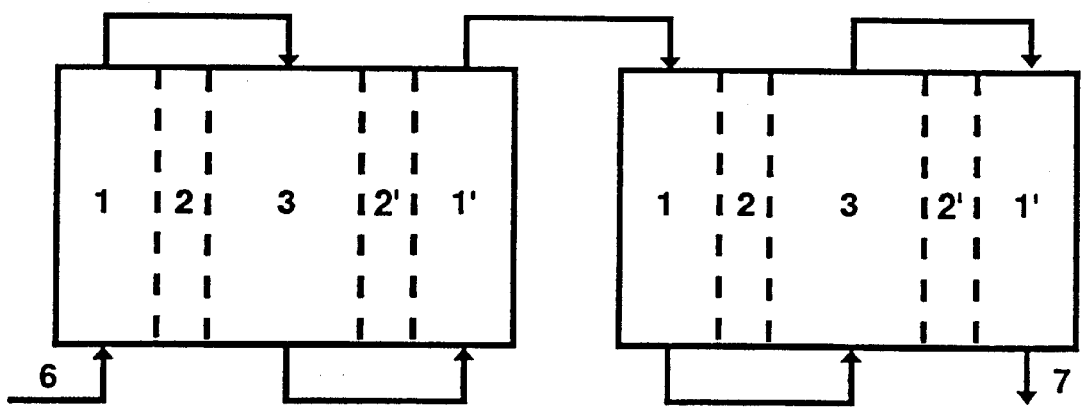
Figure 5C:
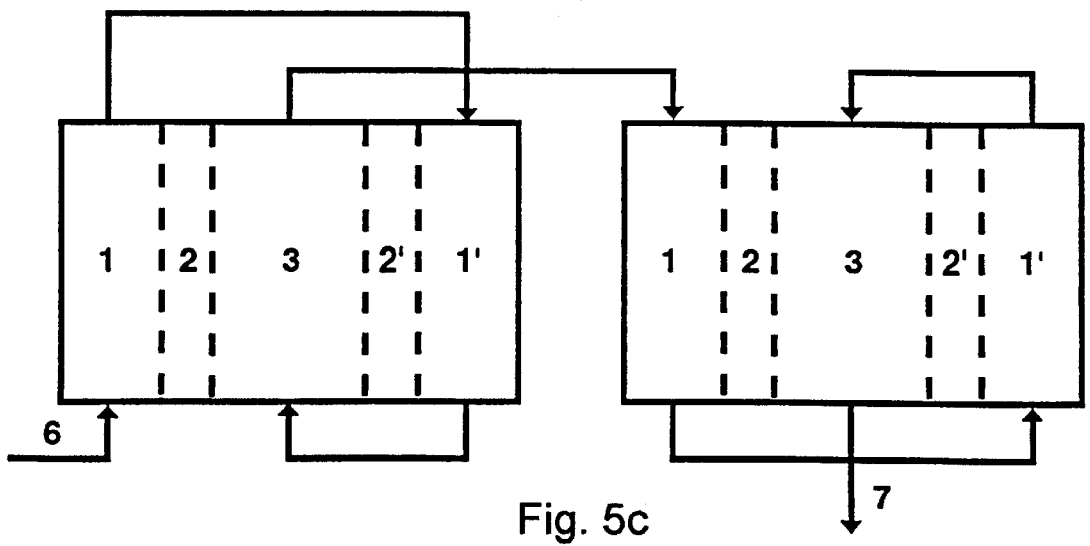

FIGS. 5A–5C and 6A and 6B show other possible flow arrangements for the main solution flow through cells arranged in series wherein according to FIGS. 5A, B, and C, the main solution flow is admitted first to a cathode chamber.

In the arrangements as shown in FIGS. 6A and 6B, the main solution flow is first admitted to the cell's anode chambers.

The main solution flow pattern through the serially arranged cells can be arranged or combined in any desirable manner.

What is claimed is:

1. An electrochemical cell arrangement for the deionization of aqueous solutions by ion exchange for the continuous generation of high-purity water from said aqueous solutions, said cell arrangement including spaced cathode and anode chambers having electrodes disposed therein, a brine chamber disposed between and directly adjacent said cathode and anode chambers, said brine chamber being separated from said cathode chamber by an anion exchange membrane and from said anode chamber by a cation exchange membrane and said cathode chamber being filled with anion exchanger material forming in said cathode chamber an anion resin bed and said anode chamber being filled with a cation exchanger material forming in said anode chamber a cation resin bed such that said electrodes are in direct contact with said anion and cation resin beds, aqueous solution supply means for conducting said aqueous solution to be treated through said resin beds and for removing the treated solution from said resin beds, means branching off said aqueous solution supply means for admitting part of said aqueous solution to said brine chamber to form a brine receiving anions and cations from the aqueous solution flowing through said cathode and anode chambers and means for removing said brine from said brine chamber.

2. An electrochemical cell arrangement according to claim 1, wherein said brine chamber is filled with ion exchange resin.

3. An electrochemical cell arrangement according to claim 2, wherein said ion exchange resin consists of at least one of the group consisting of an anion exchange resin and a cation exchange resin.

4. An electrochemical cell arrangement for the deionization of aqueous solutions by ion exchange for the continuous generation of high-purity water from said aqueous solutions, said cell arrangement including at least two electrochemical cells each having spaced cathode and anode chambers having electrodes disposed therein and a brine chamber disposed between, and directly adjacent, each of said cathode and anode chambers and being separated therefrom by ion exchange membranes, said cathode chambers being filled with anion exchanger material forming in said cathode chambers an anion resin bed and said anode chambers being filled with a cation exchanger material forming in said anode chambers a cation resin bed such that said electrodes are in direct contact with said anion and cation resin beds, said electrochemical cells being disposed adjacent each other such that different polarity electrode chambers are arranged side-by-side and separated by a bi-polar electrode to form a same polarity cell unit, aqueous solution supply means for conducting said aqueous solution to be treated through said resin beds and for removing the treated solution from said resin beds, means branching off said aqueous solution supply means for admitting part of said aqueous solution to said brine chambers for receiving anions and cations from the aqueous solution flowing through said cathode and anode chambers and means for removing said brine from said brine chambers.

5. An electrochemical cell arrangement as defined in claim 4, wherein at least two of said double cell structures of said same polarity units are arranged together.

6. An electrochemical cell arrangement according to claim 4, wherein a number of said same polarity cell units are connected in a series-flow arrangement.

7. An electrochemical cell arrangement according to claim 4, wherein there are at least a first and a second electrochemical cells, and solution and brine supply lines are so connected to said at least first and second electrochemical cells that the solution flows first through the first and then through the second cell, and the brine flows first through the second and then through the first electrochemical cell.

8. An electrochemical cell arrangement for the deionization of aqueous solutions by ion exchange for the continuous generation of high-purity water from said aqueous solutions, said cell arrangement including at least two electrochemical cells, each having spaced cathode and anode chambers with electrodes disposed therein, and a brine chamber disposed between, and directly adjacent, said cathode and anode chambers and being separated therefrom by ion exchange membranes, said cathode chamber being filled with an anion exchanger material forming in said cathode chamber an anion resin bed and said anode chamber being filled with a cation exchanger material forming in said anode chamber a cation resin bed such that said electrodes are in direct contact with said anion and cation resin beds, said electrochemical cells being disposed adjacent each other whereby different polarity electrode chambers are arranged side-by-side and separated by a bi-polar electrode to form a different polarity cell unit, aqueous solution supply means for conducting said aqueous solution to be treated through said resin beds and for removing the treated solution from said resin beds, means branching off said aqueous solution supply means for admitting part of said aqueous solution to said brine chamber to form a brine receiving anions and cations from the aqueous solution flowing through said cathode and anode chambers and means for removing said brine from said brine chamber.

9. An electrochemical cell arrangement as defined in claim 8, wherein at least two of said double cell structures of said different polarity units are arranged together.

10. An electrochemical cell arrangement according to claim 8, wherein a number of said different polarity cell units are connected in a series flow arrangement.

11. An electrochemical cell arrangement according to claim 8, wherein there are at least a first and a second electrochemical cells, and solution and brine supply lines are so connected to said at least first and second electrochemical cells that the solution flows first through the first and then through the second cell, and the brine flows first through the second and then through the first electrochemical cell.

* * * * *